United States Patent [19]

Guichon

[11] Patent Number: 5,088,792
[45] Date of Patent: Feb. 18, 1992

[54] MONOLITHIC SEAT MADE OF INJECTED PLASTICS MATERIAL

[75] Inventor: Jean-Paul Guichon, Saint Lupicin, France

[73] Assignee: Grosfillex S.A.R.L., Oyonnax, France

[21] Appl. No.: 485,293

[22] Filed: Feb. 26, 1990

[30] Foreign Application Priority Data

Mar. 1, 1989 [FR] France ................... 89 02679

[51] Int. Cl.⁵ .............................................. A47C 3/04
[52] U.S. Cl. ................................... 297/445; 297/239
[58] Field of Search ............... 297/193, DIG. 2, 452, 297/457, 445, 239

[56] References Cited

U.S. PATENT DOCUMENTS

| | | | |
|---|---|---|---|
| 3,485,525 | 12/1969 | Moore et al. | 297/239 |
| 3,586,277 | 6/1971 | Voris, Jr. | 297/239 X |
| 3,989,212 | 11/1976 | Jennings | 297/239 X |
| 4,002,369 | 1/1977 | Jennings | 297/239 X |

FOREIGN PATENT DOCUMENTS 98011 3/1961 Norway ........................ 297/239

Primary Examiner—Peter A. Aschenbrenner
Attorney, Agent, or Firm—Poms, Smith, Lande & Rose

[57] ABSTRACT

The chair according to the invention comprises a seat element with subjacent strengthening ribs, integral with four legs, a backrest and possibly armrests, said seat element further comprising:

in the median zone of its lower face and up to the vicinity of the rounded part joining with its backrest, a projecting extension of the rear rib extending in a slope for stacking, and in its upper face an opening adapted to receive the projecting element of the chair or chairs stacked thereabove, the lowermost part of said projecting element being remote from the seat element by a sufficient distance for the mould to be able to be equipped, beneath the impression defining the said rounded joining part, with a passage for a hot injection nozzle and cooling conduits.

12 Claims, 5 Drawing Sheets

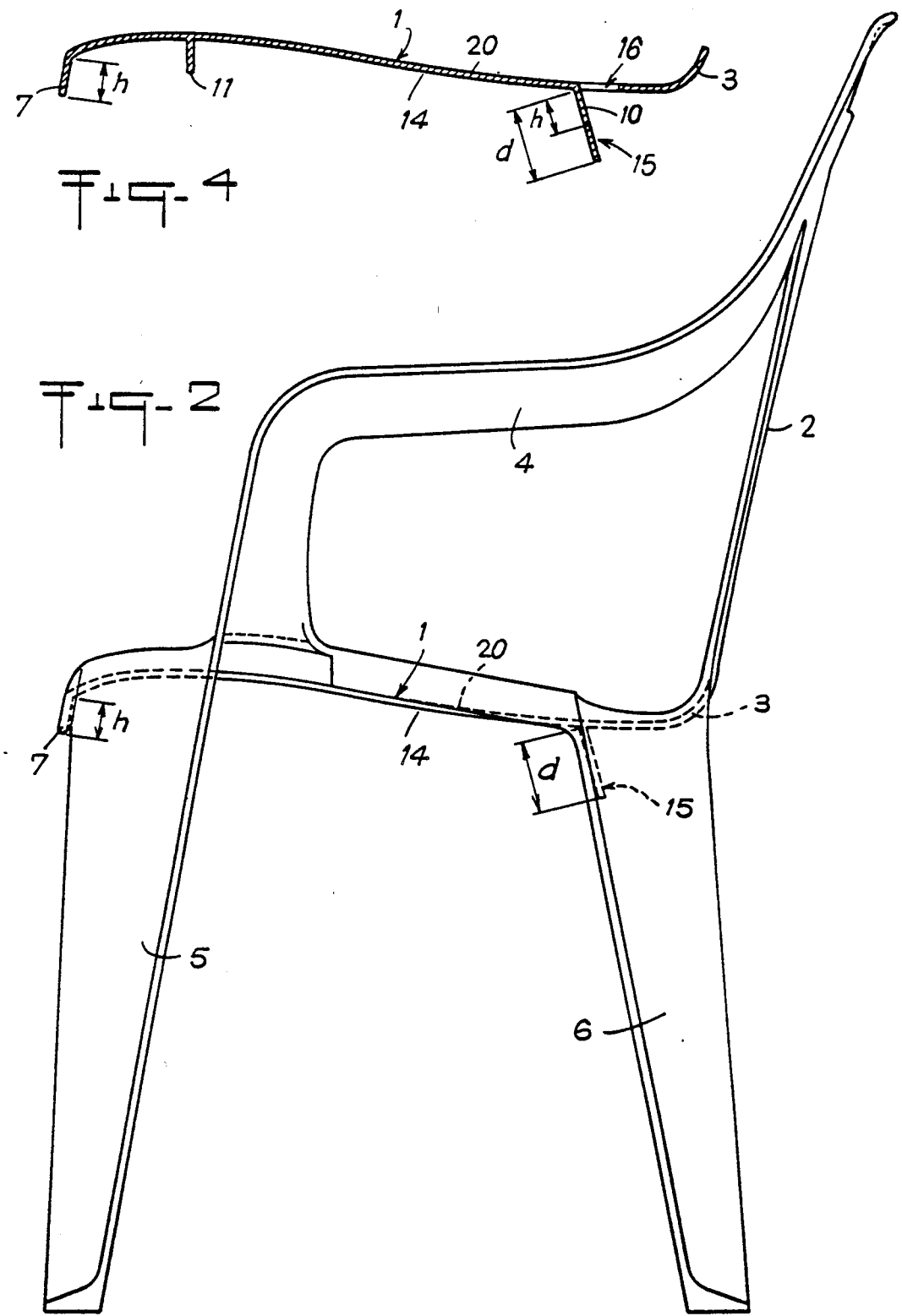

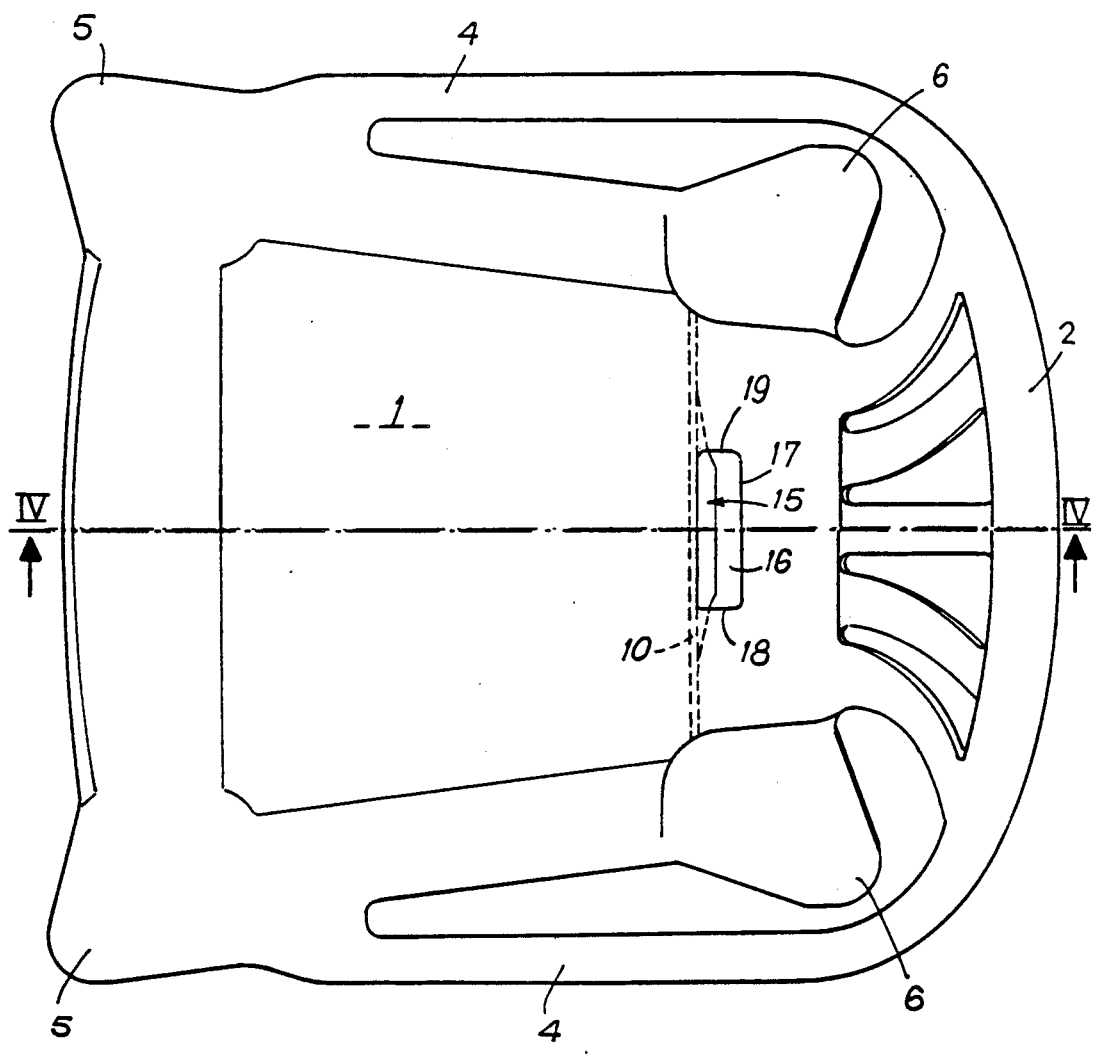

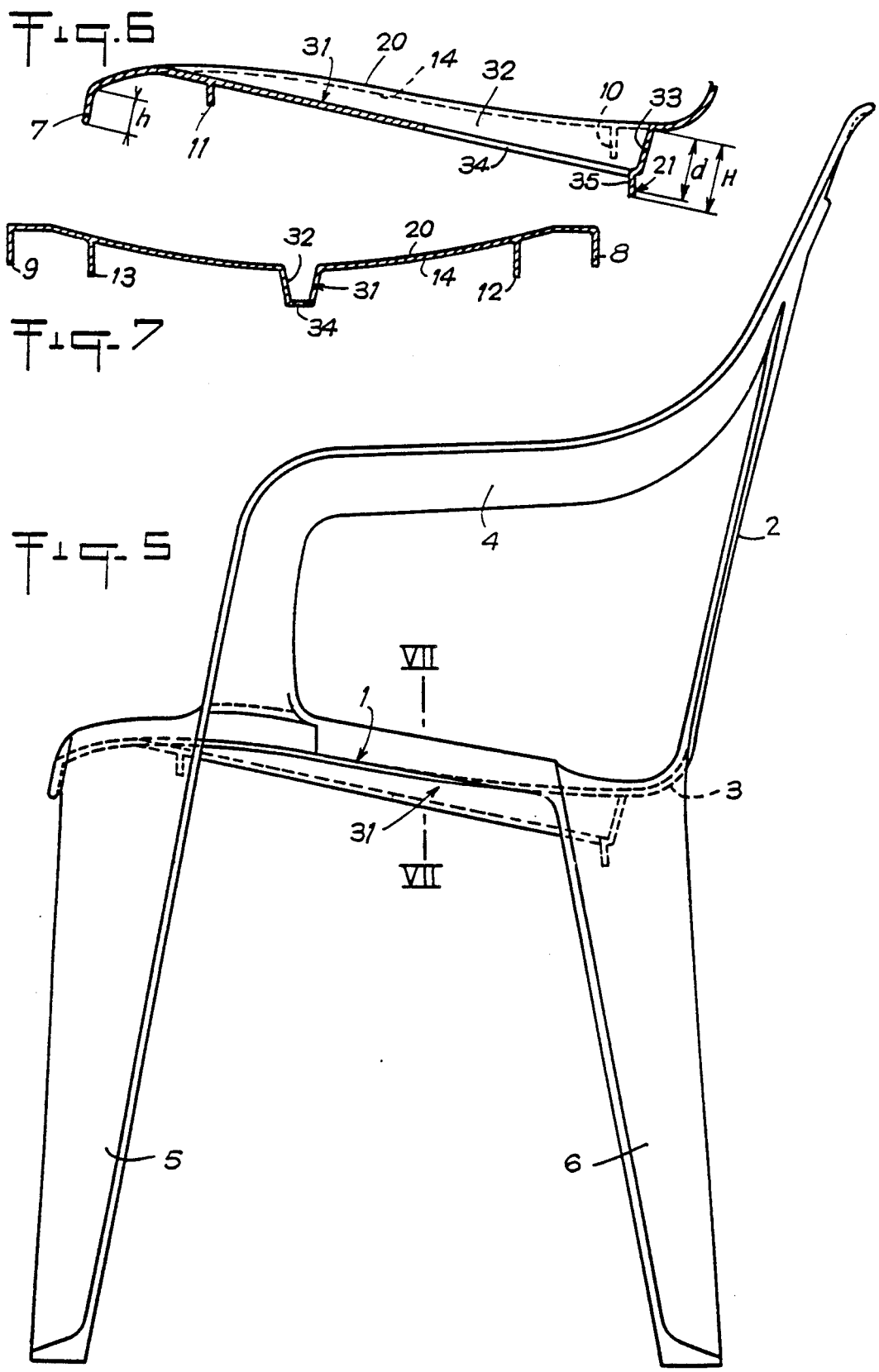

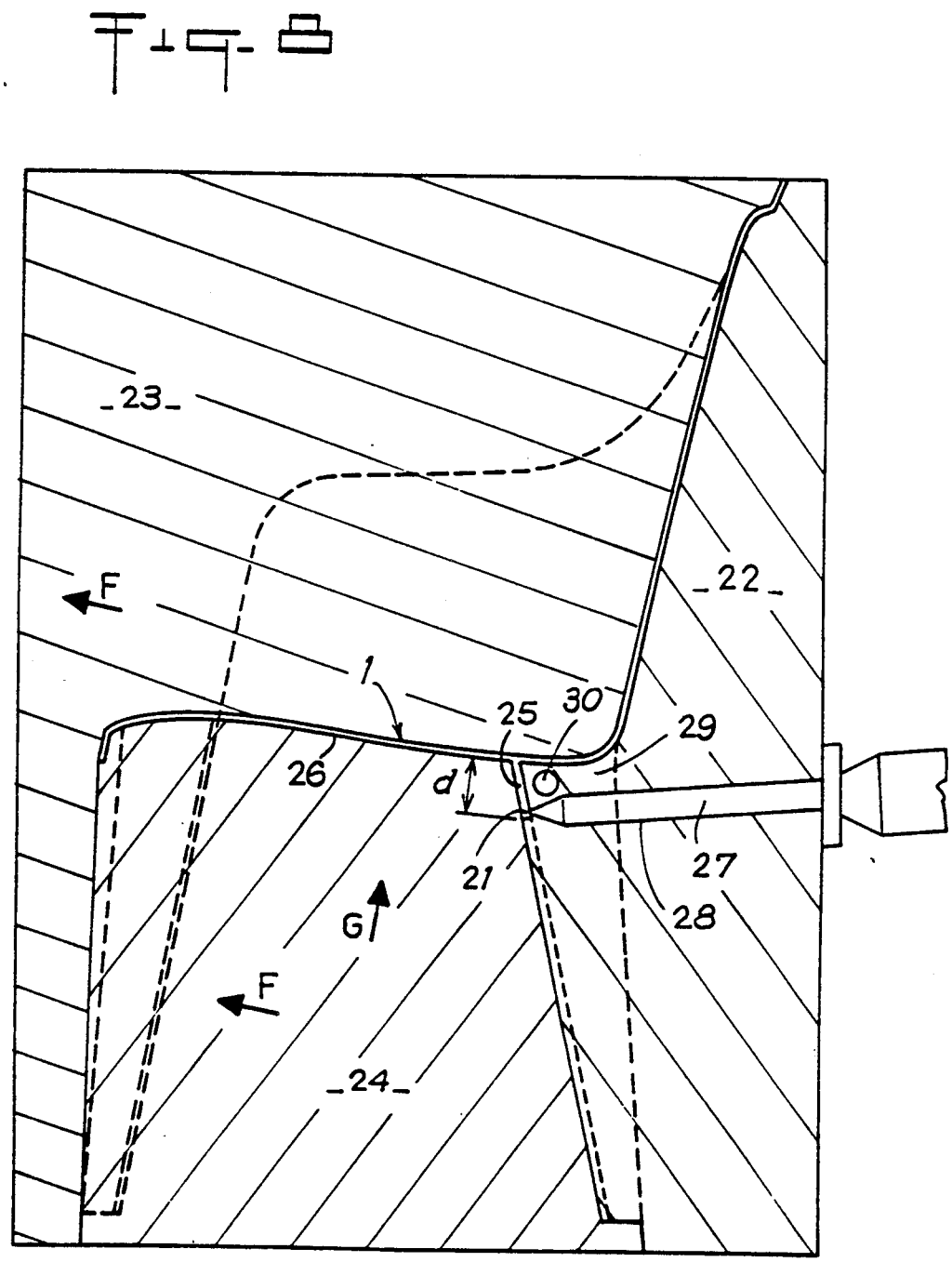

ly,088,792

MONOLITHIC SEAT MADE OF INJECTED PLASTICS MATERIAL

FIELD OF THE INVENTION

The present invention relates to a monolithic seat made of injected plastics material.

BACKGROUND OF THE INVENTION

Such a seat comprises, if it is a chair, a seat element, a backrest and four legs with, in addition, if it is an armchair, two armrests.

In order to strengthen the chair, the seat element presents a generally double band of subjacent ribs integral with the legs.

Such chairs are stackable for transport thereof in the form of a bound-up pile and for storage thereof. To that end, the legs are slightly inclined with respect to the vertical and the projection of the ribs is limited to the stacking pitch.

Injection of the chair is advantageously effected by means of a hot transfer nozzle retractably traversing the fixed part of the mould, which fixed part defines, particularly in the vicinity of said nozzle, conduits connected to a cooling circuit.

A first moulding technique consists in injecting the matter behind the rounded part where the seat element joins the backrest. The drawback of this is that defects in appearance are apparent at that spot on the finished chair.

In order to overcome this drawback, a second moulding technique consists in injecting the matter at the bottom of the rear rib. In that case, there is a major difficulty in housing in the fixed part of the mould beneath the impression defining the rounded joining part, the passage of the hot nozzle and the cooling conduits. In order satisfactorily to overcome this difficulty, the height of the ribs must exceed a certain limiting value. In that case, defects in appearance may be apparent, but this is not detrimental since they are, in principle, located at a spot hidden from view.

In any case, the lack of space is obvious when, for various reasons and in particular in order to increase the stacking capacity, the height of the ribs is reduced in correspondence with the stacking pitch.

It is an object of the present invention to overcome this drawback by increasing the distance from the point of injection to the rounded part joining the seat element to the backrest, whilst limiting the height of the ribs and even reducing it. Concomitantly, it envisages improving the quality of the product injected and its appearance, promoting the flow of the rainwater so that it does not stagnate on the seat element, rendering it easy to carry a chair, and even several stacked chairs, with one structure despite the reduction of its thickness.

SUMMARY OF THE INVENTION

To that end and in accordance with the invention,, the seat element comprises:

in the median zone of its lower face and up to the vicinity of the rounded part joining with its backrest, a sloping projecting element for stacking, and in its upper face opposite this projecting element, a hollow element adapted to receive the projecting element of the chair or chairs stacked thereabove, the lowermost part of said projecting element being remote from the seat element by a sufficient distance for the mould to be able to be equipped, beneath the impression defining the said rounded joining part, with a passage for a hot injection nozzle and cooling conduits.

According to a first embodiment, the projecting element is a median descending extension of a rear transverse rib of the seat element, defining the front of a rearwardly extending opening and constituting the said hollow element which allows flow of water as well as grip of the chair, the extension being sloping in order to allow the chair in question to be stacked on a subjacent chair of which the opening gives passage to this extension of said chair in question, the lower edge of said extension, more remote from the rounded joining part than the parallel edge of the opening, being the seat of the injection.

According to a second embodiment, the projecting element is a median antero-posterior fold of the seat element sectioned substantially as a truncated V and defining in its top a gutter which constitutes the said hollow element, the lowermost rear part of this fold being the seat of the injection.

A slot is made in the bottom of the fold for the flow of water and grip of the chair.

The fold is formed with a rear wall whose lower part is the seat of the injection, this fold extending from front to rear with increasing depth.

BRIEF DESCRIPTION OF THE DRAWINGS

The invention will be more readily understood on reading the following description with reference to the accompanying drawings, in which:

FIG. 2 is a side elevation of this armchair.

FIG. 3 is a plan view of the armchair from above.

FIG. 4 is a section taken along line IV—IV of FIG. 3.

FIG. 5 is a view similar to FIG. 2, illustrating a second embodiment of an improvement according to the invention.

FIG. 6 is a section similar to FIG. 4 concerning this second embodiment.

FIG. 7 is a section taken along line VII—VII of FIG. 5.

FIG. 8 is a diagram showing that part of the injection mould concerned by the invention.

DETAILED DESCRIPTION OF THE DRAWINGS

Figure 1:
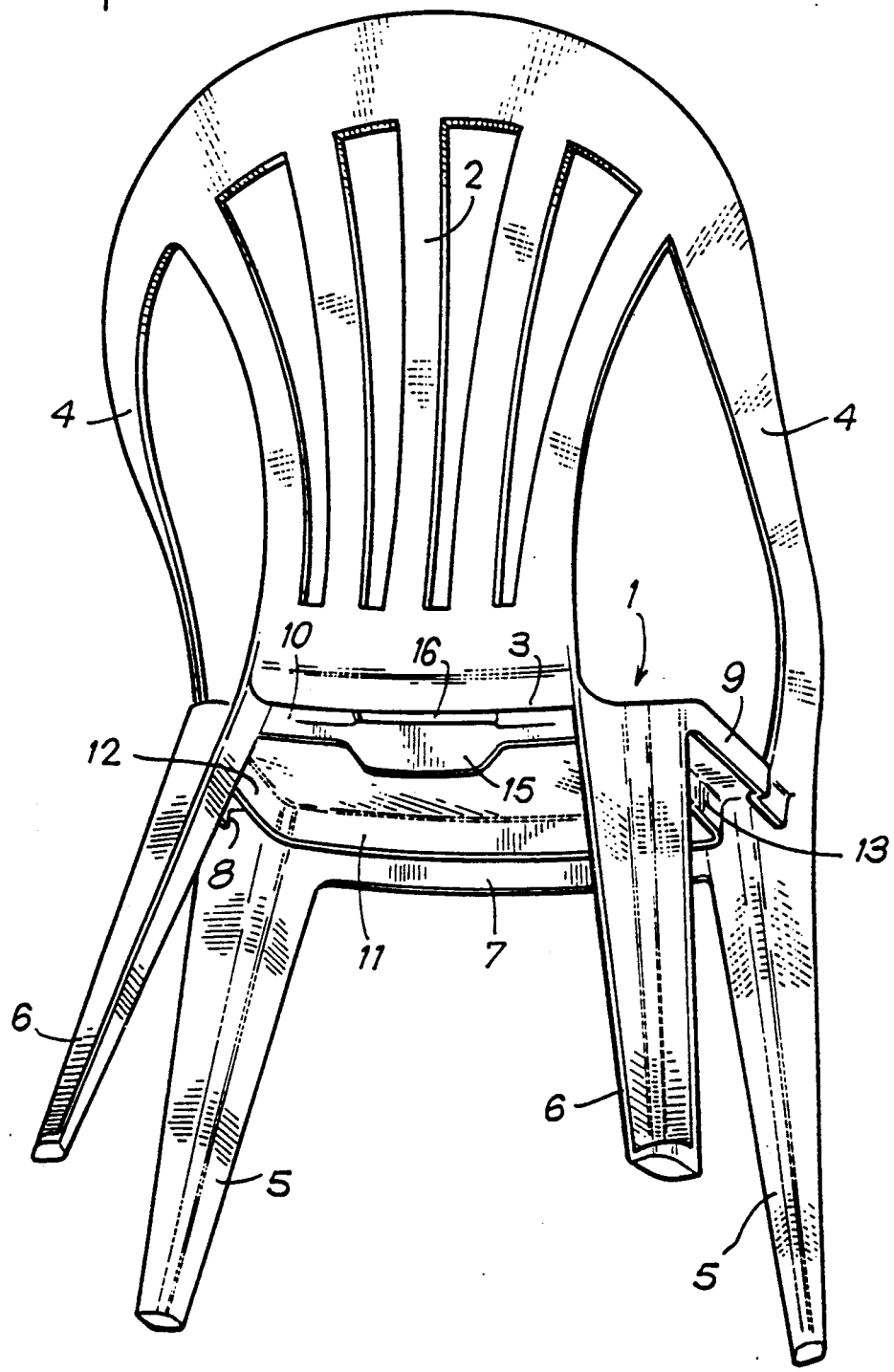
FIG. 1 is a perspective view illustrating, for an armchair, a first embodiment of an improvement brought thereto in accordance with the invention.

Referring now to the drawings, and firstly to FIG. 1, the armchair to which the improvement of the invention is applied, comprises a seat element 1 and a backrest 2 joined together by a rounded joining part 3, the backrest 2 being extended laterally by armrests 4. The seat element 1 is integral with front legs 5 sectioned as angles open on the sides and towards the front, as well as with rear legs 6 sectioned as angles open on the sides and towards the rear. The seat element 1 comprises a peripheral front edge 7 and side edges 8, 9 as well as rear (10), front (11) and side (12, 13) ribs, these edges and ribs subjacent of the seat element also being integral with the legs.

According to the first embodiment illustrated in FIGS. 1 to 4, the seat element comprises, projecting on its lower face 14, the rear rib 10 which extends to a certain distance from the rounded part 3 and presents in projection in its median zone, a trapezoidal descending extension 15. This extension borders the front of a relatively narrow transverse opening 16 whose rear edge 17 is close to the rounded part 3. This opening 16 opens out on the upper face 20 of the seat element and performs four functions:

the first, that of allowing such chairs to be stacked, giving passage to the projecting extension 15 of the overlying chair, the second, that of evacuating the rainwater flowing, over the seat element, the third, that of promoting grip of the chair at the spot of optimum balance for displacing it in one hand, giving passage to that hand which may easily take the rounded part 3 at its centre, using it as a handle.

Of course, for the projecting extension 15 to be able to penetrate in the opening 16 of the subjacent seat during stacking, without jamming, said opening must have the same slope as the "so-called vertical faces" of the armchair and in particular that of rib 10.

The faces correspond to a schematic illustration of an armchair: certain so-called vertical faces correspond to the legs, the backrest, the armrests, the edges and ribs of the seat element,... whilst other so-called horizontal faces correspond to the seat element, to the edges of the vertical faces,... For such armchairs to be stackable, the lines of greatest slope of the "so-called vertical faces" must in particular form a particular angle of fit with respect to the vertical; this angle determines the pitch of stacking when the "so-called vertical faces" of the stacked armchairs are in contact with one another.

In this way, the projecting extension 15 of rib 10 slopes along this angle and is consequently fittable in the subjacent openings 16 during stacking.

The fourth function is highly important as it considerably promotes injection. In fact, as the extension 15 is much higher than the rear rib 10 of the seat element (FIG. 1), at which rib the point of injection 21 has been located up to the present time, this point of injection may be moved away from the seat element 1 by a sufficient distance for the injection means described hereinafter with reference to FIG. 8 to be able to take their place in the mould.

As shown schematically in FIG. 8, the mould is generally in three parts 22 to 24. Part 22 is fixed and presents an impression defining in particular the rear vertical face of the backrest 2 and r ear legs 6. Part 23 is movable in the direction of arrow F and presents an impression defining in particular the front vertical face of the backrest 2 and front legs 5 as well as the upper horizontal face of the seat element 1. Part 24 is movable in the direction of arrow F and presents an impression defining in particular the front vertical faces of the rear legs 6 and rear vertical faces of the front legs 5 as well as the lower horizontal face of the seating element 1, this part 24 comprising ejectors movable in the direction of arrow G.

In order to demould an armchair, part 23 must firstly be moved in the direction of arrow F to remove it from the armchair remaining captive of parts 22 and 24; part 24 must then be moved in the direction of arrow F to remove from part 22 the armchair which remains captive of part 24; finally, the ejectors must be moved in the direction of arrow G to demould the armchair from this part 24.

This description of the mould is simplified and summary as it is only of interest to enable the following to be understood. In particular, the organization and functioning of the mould on the sides is of little importance.

The overall impression 25 of the projecting extension 15 is thus defined by parts 22 and 24 and at least one point of injection 21 is located at the bottom of this impression at a distance "d" from the impression 26 of the seat element, greater than the average height h (FIGS. 2 and 4) of the edges and ribs of said seat element.

Consequently, at least ore hot injection nozzle 27 extends in a passage 28 in part 22 of the mould, which passage is located relatively low with respect to impression 26 and there remains in said part 22 of the mould between that impression and the passage 28 a mass of conducting matter 29 which is sufficiently voluminous for cooling conduits 30 to be easily arranged therein.

This improvement, constituted by the projecting extension 15, results in the injection being carried out under excellent conditions and without apparent defects.

Of course, the antero-posterior edges 18, 19 of the opening 16, instead of being sharp like the rear edge 17, may be defined by triangular flanges (not shown) integral with the rib 10 and its extension 15 projecting on the lower face 14 of the seat element 1.

According to the second embodiment illustrated in FIGS. 5 to 7, the seat element 1 comprises a fold 31 extending in the median antero-posterior direction. This fold is in the form of a truncated V and defines on the upper face 20 of the seat element a gutter 32 whose depth is greater to the rear than at the front. It defines in its bottom near its rear wall 33 a slot 34 adapted, on the one hand, to allow evacuation of the water canalized by the gutter 32 and, on the other hand, to form a gripping handle.

The fold 31 projects on the lower face 14 of the seat element over a height H greater, as in the preceding embodiment and for the same reason, than height h of the edges and ribs of the seat element. Folds 31 of stacked armchairs therefore fit in one another, which makes it possible to reduce the pitch of stacking, or at least not to increase it, whilst the distance d from the point of injection 21 to the seat element 1 is increased.

In fact, the point of injection 21 is located at the bottom of the rear wall 33 of the fold 31 or, better, at the bottom of the rib 35 which extends it. Other transverse ribs may, moreover, be provided over the length of the fold 31.

Of course, and as may be seen in FIG. 4, the edge 10 of the seat element 1 is integral with the sides 18 and 19 of the opening 16 . Similarly, and as shown in FIG. 6, the rear edge 10 and the front rib 11 are integral with the fold 31.

What is claimed is:

1. In a monolithic stackable seat made of injected plastics material, such as a chair or an armchair, mouldable without visible defects and comprising a seat element with subjacent strengthening ribs, integral with four legs and a backrest, the seat having a rounded part joining with the backrest, the seat comprises:
  in the central area of its lower face and up to the vicinity of the rounded part joining with the backrest, a projecting element having a slope oriented for stacking,
  and in its upper face opposite this projecting element, a hollow element adapted to receive the projecting element of the chair or chairs stacked thereabove, the lowermost part of said projecting element being remote from the seat element.

2. The seat of claim 1, wherein said seat is an armchair equipped armrests.

3. The seat of claim 1, comprising a rear transverse rib which extends parallel to said rounded joint part, wherein the projecting element is an extension of the rear transverse rib defining the front of a rearwardly extending opening and constituting the said hollow element which allows flow of water as well as grip of the chair, the extension being sloping in order to allow the chair to be stacked on a subjacent chair of which the opening gives passage to this extension of said chair.

4. The seat of claim 2, comprising a rear transverse rib which extends parallel to said rounded joint part, wherein the projecting element is an extension of the rear transverse rib defining the front of a rearwardly extending opening and constituting the said hollow element which allows flow of water as well as grip of the chair, the extension being sloping in order to allow the chair to be stacked on a subjacent chair of which the opening gives passage to this extension of said chair.

5. The seat of claim 1 wherein the projecting element is a fold in the seat substantially as a truncated V and defining in its top a gutter which constitutes the said hollow element.

6. The seat of claim 2 wherein the projecting element is a fold in the seat substantially as a truncated V and defining in its top a gutter which constitutes the said hollow element.

7. The seat of claim 5, wherein a slot is made in the bottom of the fold for the flow of water and grip of the chair.

8. The seat of claim 5 wherein the fold is formed with a rear wall, this fold extending from front to rear with increasing depth.

9. The seat of claim 7 wherein the fold is formed with a rear wall, this fold extending from front to rear with increasing depth.

10. The seat of claim 8, having transverse ribs which project beneath the fold.

11. The seat of claim 3 wherein the strengthening ribs of the seat element, located to the rear, are integral with the projecting element.

12. The seat of claim 11 wherein the strengthening ribs of the seat element, located to the rear, are integral with the projecting element.

* * * * *